United States Patent
Namikata et al.

(10) Patent No.: US 7,844,129 B2
(45) Date of Patent: Nov. 30, 2010

(54) INFORMATION PROCESSING APPARATUS AND ITS CONTROL METHOD

(75) Inventors: Takeshi Namikata, Yokohama (JP); Yushi Matsukubo, Yokohama (JP); Yukihiko Shimizu, Urayasu (JP); Masataka Yasuda, Kawasaki (JP); Noriyuki Kobayashi, Kawasaki (JP); Shinichiro Maekawa, Kawasaki (JP); Hideki Sakai, Sakura (JP); Hirohiko Tashiro, Kawasaki (JP); Atsushi Matsumoto, Tokyo (JP); Masamichi Akashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1574 days.

(21) Appl. No.: 11/148,264

(22) Filed: Jun. 9, 2005

(65) Prior Publication Data
US 2005/0289215 A1    Dec. 29, 2005

(30) Foreign Application Priority Data
Jun. 9, 2004    (JP)    ............... 2004-171770

(51) Int. Cl.
  G06K 9/40    (2006.01)
  G06K 15/16    (2006.01)
(52) U.S. Cl. .................. 382/284; 709/201
(58) Field of Classification Search ............. 382/167, 382/173, 254, 260, 264, 274, 275, 305, 312; 358/1.9, 3.06, 518, 519, 1.14, 1.15, 1.18, 358/296; 709/201, 217, 220, 227, 238
See application file for complete search history.

(56) References Cited

U.S. PATENT DOCUMENTS

| | | | | |
|---|---|---|---|---|
| 5,774,638 A | * | 6/1998 | Kageyama et al. | 358/1.15 |
| 5,940,186 A | * | 8/1999 | Barry et al. | 358/296 |
| 6,633,396 B1 | * | 10/2003 | Barry et al. | 358/1.14 |
| 7,161,705 B2 | * | 1/2007 | Klassen | 358/1.18 |
| 7,200,626 B1 | * | 4/2007 | Hoang et al. | 707/204 |
| 2002/0078117 A1 | * | 6/2002 | Wang Baldonado et al. | 709/101 |

FOREIGN PATENT DOCUMENTS

| | | |
|---|---|---|
| JP | 10-276323 | 10/1998 |
| JP | 11-024860 | 1/1999 |
| JP | 11-085967 | 3/1999 |

OTHER PUBLICATIONS

Office Action, dated Jul. 11, 2008, in JP 2004-171770.
U.S. Appl. No. 11/148,257, filed Jun. 9, 2005.
U.S. Appl. No. 11/148,268, filed Jun. 9, 2005.
U.S. Appl. No. 11/148,269, filed Jun. 9, 2005.
U.S. Appl. No. 11/148,286, filed Jun. 9, 2005.
U.S. Appl. No. 11/148,298, filed Jun. 9, 2005.
U.S. Appl. No. 11/197,511, filed Aug. 5, 2005.

* cited by examiner

Primary Examiner—Kanji Patel
(74) Attorney, Agent, or Firm—Fitzpatrick, Cella, Harper & Scinto (57) ABSTRACT

Even when a CPU gains higher performance and a distributed computing environment is being put in place, it is not easy to follow the speed of hardware image processing implemented by dedicated hardware. Hence, jobs of filter processing having a heavy operation load and low distributability are selectively and intensively input to a small number of resources having performance as high as possible. On the other hand, since the color conversion processing and gamma processing have high distributability, even when jobs are input to many resources having low performance, an improvement of the processing speed can be expected. Therefor, color conversion processing and gamma processing distribute jobs to many resources.

14 Claims, 9 Drawing Sheets

| | |
|---|---|
| 1. COLOR CONVERSION PROCESSING | ~601 |
| 2. FILTER PROCESSING | ~602 |
|   2-1. SMOOTHING | ~603 |
| 3. GAMMA CONVERSION PROCESSING | ~604 |
| 4. HALFTONE PROCESSING | ~605 |
| 5. PRINTER OUTPUT | ~606 |
|   5-1. PRINTER 14M | ~607 |

FIG. 8

| | OPERATION LOAD | DISTRIBUTABILITY |
|---|---|---|
| 1. COLOR CONVERSION PROCESSING | 2 | 3 |
| 2. FILTER PROCESSING | 3 | 1 |
| 3. GAMMA CONVERSION PROCESSING | 1 | 3 |
| 4. HALFTONE PROCESSING | 2 | 1 |

| PHOTO AREA TABLE | | |
|---|---|---|
| | OPERATION LOAD | DISTRIBUTABILITY |
| 1. COLOR CONVERSION PROCESSING | 2 | 3 |
| 2. FILER PROCESSING | 3 | 1 |
| 3. GAMMA CONVERSION PROCESSING | 1 | 3 |
| 4. HALFTONE PROCESSING | 2 | 1 |

FIG. 10B

| TEXT AREA TABLE | | |
|---|---|---|
| | OPERATION LOAD | DISTRIBUTABILITY |
| 1. COLOR CONVERSION PROCESSING | 1 | 3 |
| 2. FILER PROCESSING | 3 | 1 |
| 3. GAMMA CONVERSION PROCESSING | 1 | 3 |
| 4. HALFTONE PROCESSING | 3 | 1 |

INFORMATION PROCESSING APPARATUS AND ITS CONTROL METHOD

FIELD OF THE INVENTION

The present invention relates to an information processing apparatus and its control method and, more particularly, to a distributed load system of grid computing that executes image processing by utilizing image processing modules of information processing apparatuses distributed on a computer network.

BACKGROUND OF THE INVENTION

A multi-functional peripheral equipment (to be referred to as "MFP" hereinafter) which has copy, printer, and facsimile functions has long been around. In the MFP, the copy function is implemented by applying image processing to an image scanned by a scanner, and outputting it to a printer. The printer function is implemented by receiving print data generated by a host computer, applying rendering and image processes to the print data, and outputting it to the printer.

In recent years, the image resolution of the scanner and printer of the MFP is 600 dpi, 1200 dpi, or the like, and the number of pages that can be processed per minute is as many as 50 color pages and 100 monochrome pages in case of a faster one. For this reason, large-size image data must be processed at high speed, and the image processing of the MFP is implemented by hardware using a dedicated image processing LSI (ASIC).

The image processing by means of hardware (to be referred to as "hardware image processing" hereinafter) can meet a high-speed requirement, but it has demerits such as hard modifiability and poor flexibility, high cost, and the like. When the logic of the already prepared image processing LSI is to be slightly modified, it requires much time and cost. For this reason, studies have been made to implement various kinds of image processing by software with high flexibility. To speed up upon implementing the image processing by means of software (to be referred to as "software image processing" hereinafter), it is effective to execute distributed processing by dividing large-size image data, and a plurality of proposals have been made.

In recent years, parallel distributed processing computing techniques such as PC clustering, grid computing, and the like have been developed, and development of these techniques has an advantage upon implementing the software image processing. In the grid computing technique, procedures required to use computation resources on a network are simple. As long as a grid is built on the network, computation resources can be used very easily. With this technique, an image processing system which can enjoy merits such as flexibility of the software image processing, and easy management obtained from the distributed processing technique (especially, grid computing) can be proposed.

However, even when a CPU gains higher performance and a distributed computing environment is being put in place, it is not easy to follow the speed of the hardware image processing implemented by the dedicated hardware. In the parallel distributed processing environment, it is indispensable to configure the system so that it can execute higher-speed processing as much as possible.

SUMMARY OF THE INVENTION

According to the first aspect of the present invention, there is disclosed an information processing apparatus connected to a computer network, which receives a task and an image to be processed by the task from the computer network, selects a computer device that execute distributed processing of the task on the basis of the states and performances of computer devices connected to the computer network and the analyzing result of the task, generates and transmits jobs, each of which includes an image divided from the image to be processed and is transmitted to the selected computer device, receives a processed image as the processing results from the computer device to which the job was transmitted, and integrates received processed images to form one image.

According to the second aspect of the present invention, there is disclosed an information processing apparatus which receives image data and list data indicating image processes to be applied to the image data, checks available resources, and determines resources used in distributed processing of the image on the basis of information indicating the operation load and distributablity of the respective image processes indicated by the list data.

According to the aforementioned apparatus and processing, speeding up of the distributed processing of image processing can be attained.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail hereinafter with reference to the accompanying drawings.

[Grid Computing]

Figure 1:
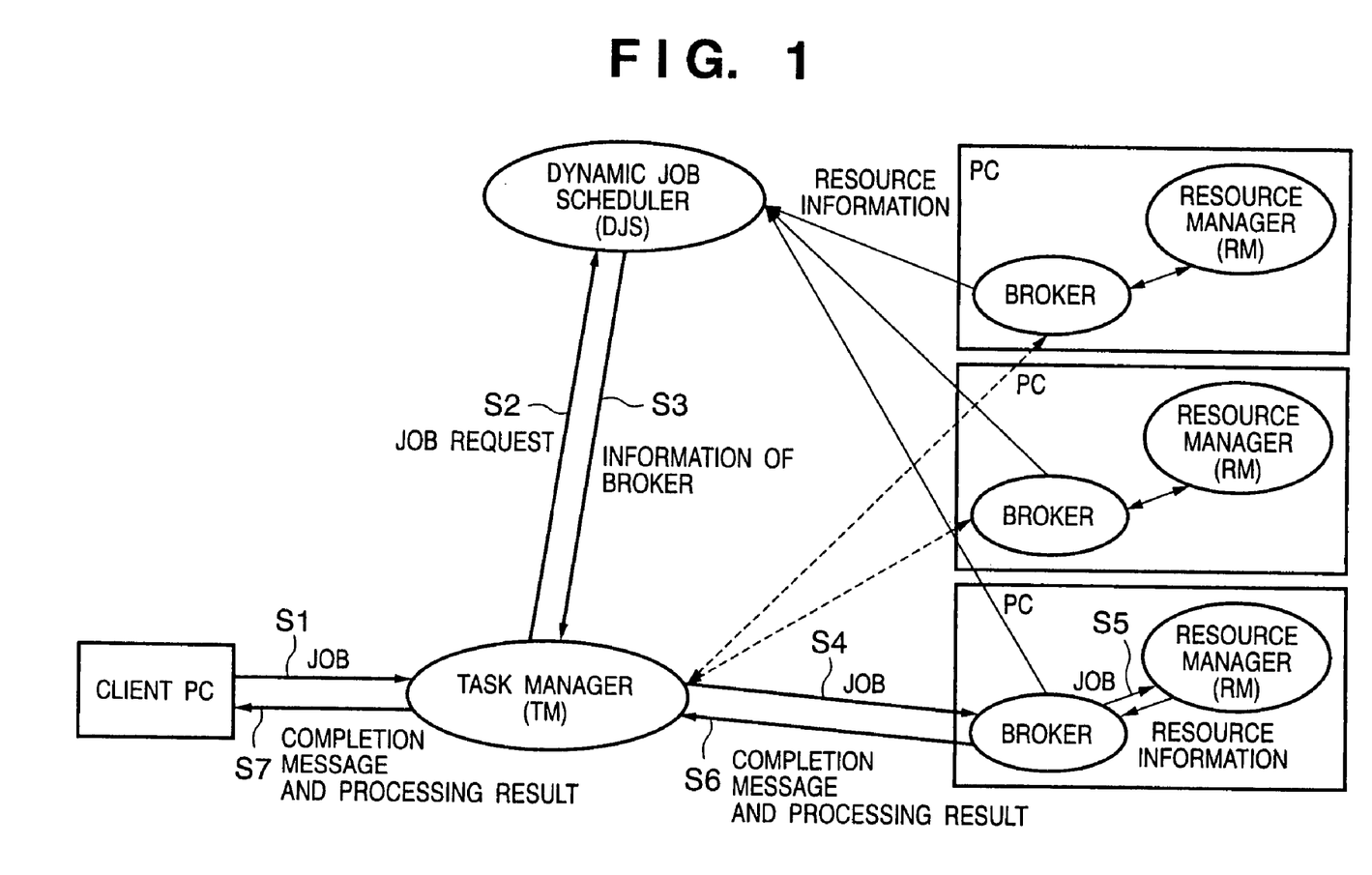
FIG. 1 is a diagram for explaining the architecture of grid computing.

FIG. 1 is a diagram for explaining the architecture of grid computing. There are several types of grids. A grid to be described below is of the type called a desktop grid, which executes a job by utilizing an idle time of a CPU of a desktop PC or the like.

A client PC shown in FIG. 1 inputs a job in accordance with a user's instruction (S1). That request (job) is passed to a task manager (to be abbreviated as "TM" hereinafter), which informs a dynamic job scheduler (to be abbreviated as "DJS" hereinafter) of the contents (job request) (S2). The DJS which manages the resources of the overall grid computing system selects brokers of optimal resources and informs the TM of the selected brokers (S3). Note that the resource means an idle state of a CPU of a PC.

The broker in each PC registers, in the DJS, resource information which is received by a resource manager (to be abbreviated as "RM" hereinafter) in the PC. Upon reception of a request from the TM, the broker inputs a job to the RM (S4), and notifies the TM of completion of the job (and the processing result (S5). The TM inputs jobs to the brokers selected by the DJS, and monitors the status of these jobs. Upon reception of a completion message (and processing result) from each broker (S6), the TM sends a completion message (and processing result) to the client PC (S7).

The RM notifies the broker of the resource information, and inputs a job to the resource in accordance with a broker's instruction. The RM periodically checks the status of the resource. If the RM finds a change or abnormality of the resource (e.g., a trouble, reception of another job, or the like), it advises the broker accordingly.

With this scheme, the implementation form of desktop grid computing is to allow distributed processing by distributing jobs to the resources of optimal CPUs (which are not used normally).

Figure 2:
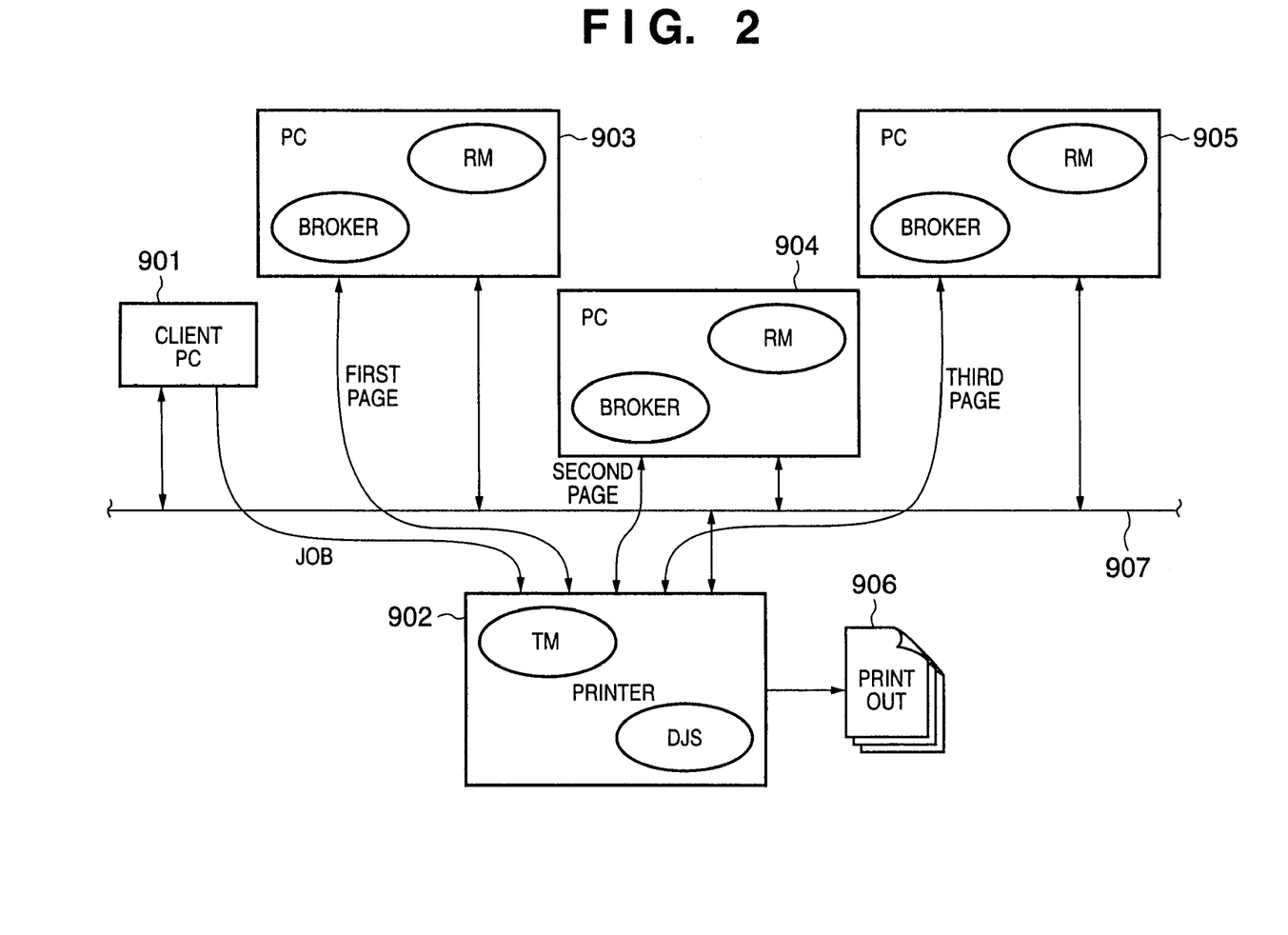
FIG. 2 is a diagram for explaining the arrangement when the technique of desktop grid computing is applied to printer description language (PDL) processing.

FIG. 2 is a diagram for explaining an example of the arrangement when the technique of desktop grid computing is applied to printer description language (PDL) processing. In the description of FIG. 1, modules which form the grid are handled as independent ones. However, when the technique of desktop grid computing is applied to a printer, a plurality of modules exist in a single device in general.

A client PC 901 in FIG. 2 issues a print instruction (inputs a print job) to a printer 902. The printer 902 has functions of the TM and DJS (i.e., it serves as a host machine of the distributed processing), and PCs 903 to 905 have functions of the broker and RM. This arrangement allows distributed processing based on grid computing using, e.g., three PCs connected to a network 907.

A job (print job of PDL format data) input from the client PC 901 is distributed to respective resources (e.g., the first page of that job to the PC 903, the second page to the PC 904, and the third page to the PC 905) by the TM and DJS of the printer 902 as the host machine, and these PCs execute rendering processes from the PDL data to image data. In this case, the printer 902 simultaneously transmits an application program for the rendering processing of PDL data to the respective resources. The printer 902 as the host machine collects images rendered based on the PDL data by the PCs (i.e., the processing results of images of the first to third pages), prints out images 906 for three pages, and notifies the client PC 901 of completion of the print job.

Of course, the target resources of this distributed processing may be four or more PCs, and the resource on the client PC 901 as a job input source may be used. Also, other printer resources on the network 907 may be used.

An embodiment which makes image processing modules on the network implement higher-speed distributed processing by utilizing the grid computing technique will be described in detail hereinafter.

First Embodiment

An image processing system which implements the copy function of an MFP using the framework of grid computing and an image input/output apparatus will be described below.

[Image Processing System]

Figure 3:
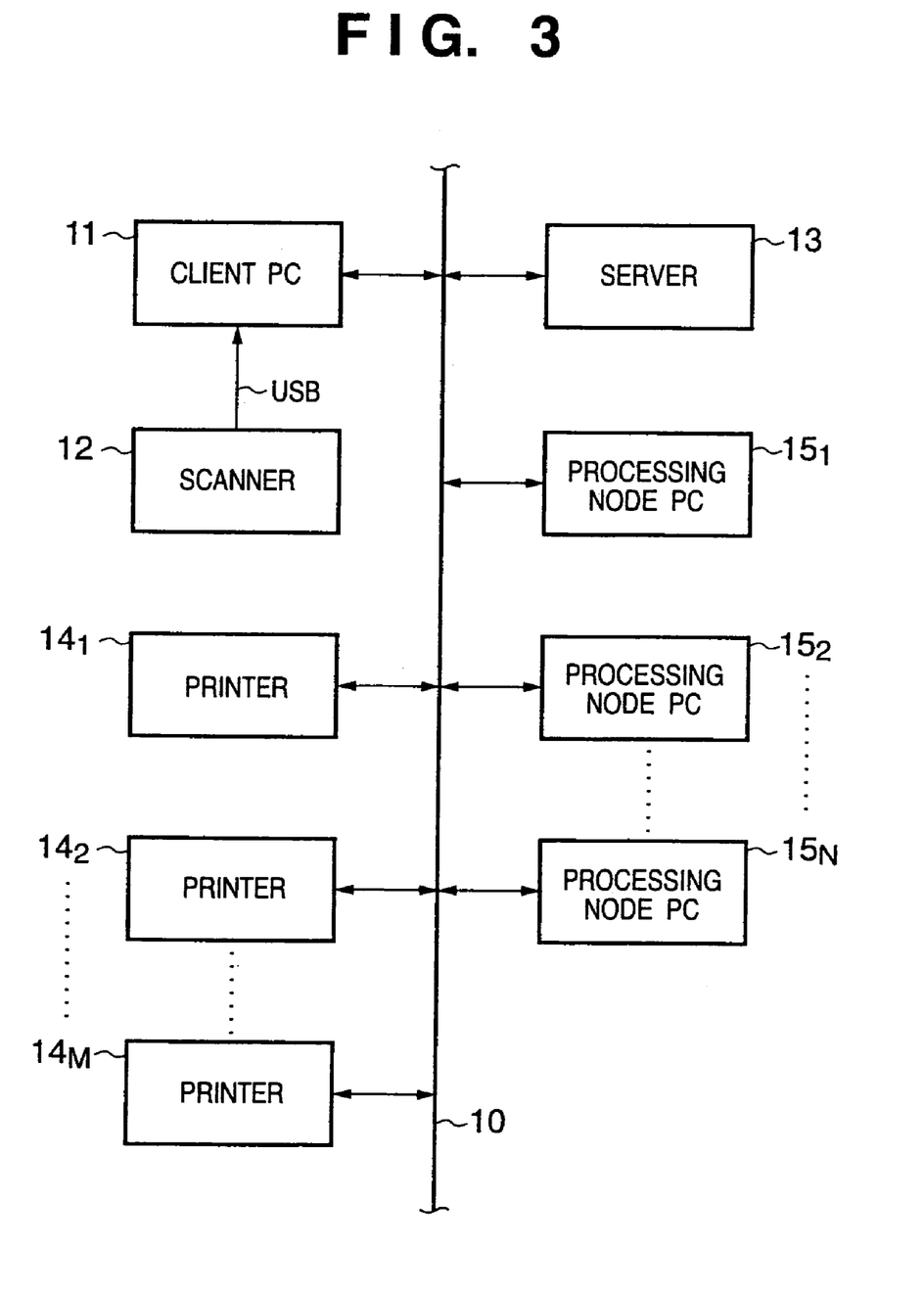
FIG. 3 is a block diagram showing the arrangement of an image processing system according to the first embodiment.

FIG. 3 is a block diagram showing the arrangement of an image processing system according to the first embodiment.

A client PC 11, server 13, processing node PCs $15_1$ to $15_N$, and printers $14_1$ to $14_M$ are connected to a network 10. A scanner 12 is connected to the client PC 11 via the USB (Universal Serial Bus). In this image processing system, the client PC 11 provides a user interface to the user, and executes a job upon reception of a user's instruction. Also, the client PC 11 controls the scanner 12 to scan a document image.

The client PC 11 is a general-purpose computer system which has at least a CPU, RAM, ROM, hard disk drive (HDD), network interface (I/F), display interface, USB (Universal Serial Bus) port, and keyboard and mouse which are used by the user to input information and instruction. On this PC 11, a basic OS such as Windows®, Linux, or the like runs. The server 13 and other processing nodes $15_1$ to $15_N$ connected to the network are also general-purpose computer systems, and operate on the basis of the basic OS such as Windows®, Linux, or the like.

The scanner 12 converts a document image placed on its platen glass into an image signal by a CCD and inputs the image signal to the client PC 11 via the USB in accordance with a user's instruction input via the keyboard/mouse and application by a scanner driver called from an application that runs on the OS of the client PC 11. In the first embodiment, assume that the scanner 12 is a color scanner having a read resolution of 600 dpi, and the CCD has R, G, and B color filters, and inputs image signals (8 bits per color) of color-separated color components to the client PC 11. Of course, the present invention is not limited to the number of bits of an image signal and the resolution.

The client PC 11 that received the image signal often converts an RGB color signal unique to the scanner to an image signal of a device-independent color space by the scanner driver or the application using the scanner driver. In the first embodiment, the client PC 11 converts an RGB image signal input from the scanner 12 into an image signal on an sRGB color space (to be referred to as "sRGB image signal" hereinafter). Of course, the RGB image signal may be converted into image signals of other device-independent color spaces (Lab, YCrCb, and the like). The image signal, which is scanned by the scanner 12 and is input to the client PC 11 is stored in the RAM or HDD of the client PC 11 as an sRGB image signal.

In the server 13 and processing node PCs $15_1$ to $15_N$, software modules for grid computing (to be described later) run to form a grid together with the network 10. That is, in the first embodiment, an image processing apparatus in the MFP is configured as a software module on the grid.

[Printer]

Figure 4:
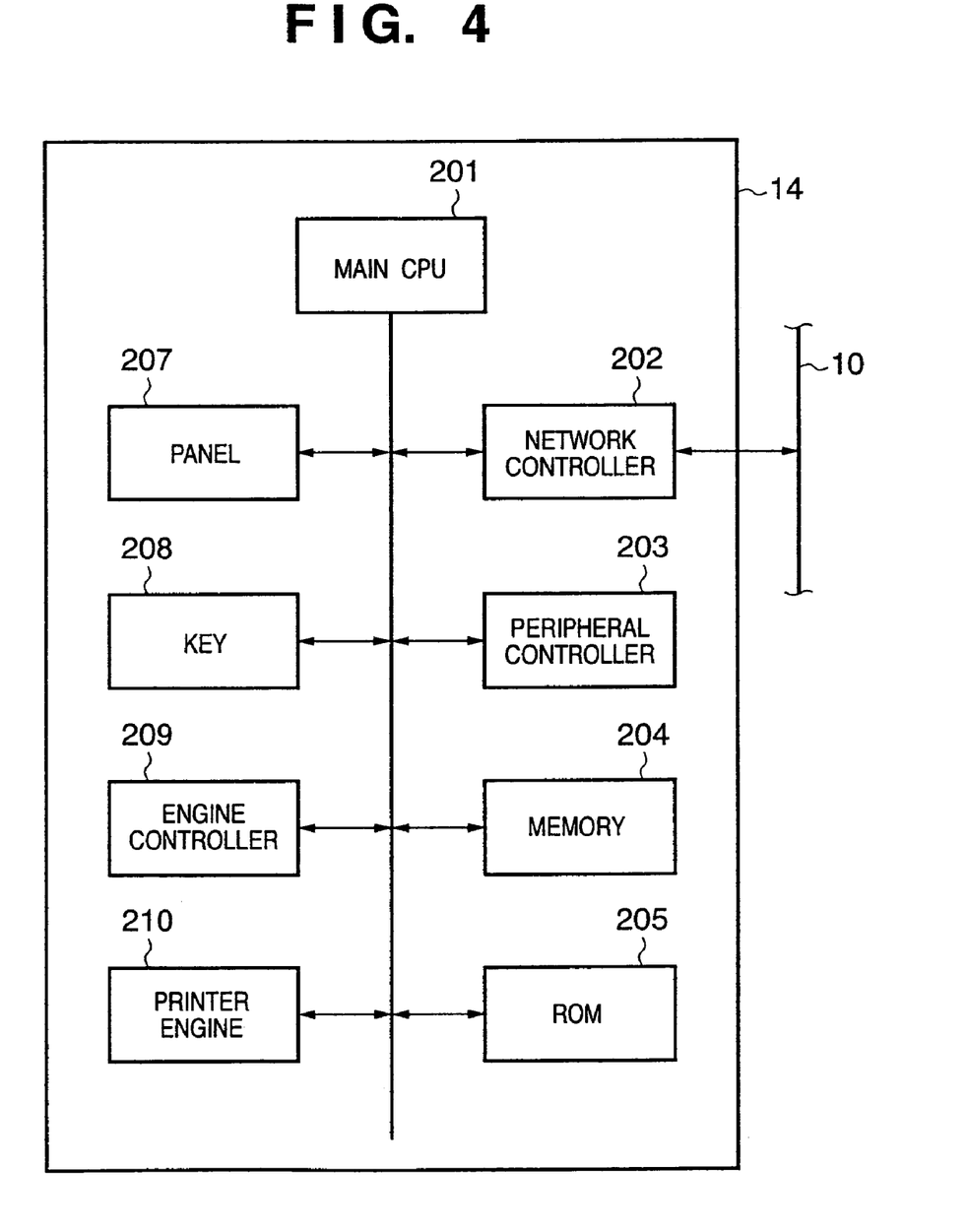
FIG. 4 is a block diagram showing the arrangement of a printer.

FIG. 4 is a block diagram showing the arrangement of the printers $14_1$ to $14_M$.

A main CPU 201 controls the overall printer 14. A network controller 202 communicates with another device on the network 10, receives a print request command and print data, a save request command and save data, and the like from the client PC 11 and server 13, and passes them to the main CPU

201. A peripheral controller 203 controls components from a memory 204 to printer engine 210, which are connected to the main CPU 201 via a system bus 211.

A memory 204 comprises a RAM or the like. The memory 204 serves as a main memory which temporarily saves bitmap data to be printed and the like, and saves program data of an execution program, intermediate codes and intermediate data during execution of the program, and the like. A ROM 205 is a read-only memory which saves control programs and the like which are used to control the overall apparatus as well as initial control such as activation and the like of the printer 14 main body.

On a panel 207, buttons corresponding to operation commands intended by the operator of the printer, and a monitor which displays the progress of internal processing and internal status of the printer 14 in response to an operation command or the like input by the operator are arranged. A key 208 is an input device which receives a control request intended by the operator of the printer 14 and a display switching instruction of the panel 207. An engine controller 209 controls driving of a printer engine 210, transfer of print output data, and the like. A printer engine 210 is a printer mechanism which forms a print output image.

The printer 14 receives CMYK bitmap image data (1 bit per color) which has undergone halftone processing for respective pages or bands, and prints the received image data using the printer engine 210. Of course, the number of bits of the image data that has undergone the halftone processing is not limited to 1 bit per color, but multi-valued data such as 2 bits, 4 bits, and the like may be used instead. That is, the printer 14 need only have a function of printing received image data using the printer engine 210, and can have a very inexpensive arrangement since it does not have any image processor.

[Correspondence to Architecture of Grid Computing]

An overview of the correspondence between the image processing system of the first embodiment and the grid computing architecture shown in FIG. 1 will be explained below.

The client PC 11 shown in FIG. 11 is a user's client machine which corresponds to the client PC in FIG. 1 and inputs a task request. That is, the task request is as follows. The client PC 11 applies image processing suited to the printer (one of $14_1$ to $14_M$) designated by the user to image data of a document image scanned by the scanner 12, transmits the image data that has undergone the image processing to the printer designated by the user, and controls the printer to execute a print operation.

On the server 13 shown in FIG. 3, the TM and DJS run, and a task request is input from the client PC 11 to the TM and DJS. The TM receives image data together with the task request (job) of the client PC 11, divides the image data as needed, and inputs the job together with the divided image data to brokers selected by the DJS. Each broker to which the job is input inputs the job to the processing node PCs $15_1$ to $15_N$ as resources. The processing node PCs $15_1$ to $15_N$ operate image processing modules in accordance with the job, and process the supplied divided image data. Upon completion of the image processes of the processing node PCs $15_1$ to $15_N$ as the resources, each broker returns a completion message and processing results to the TM.

Upon completion of the image processes by the resources of all the brokers to which the job is input, the TM integrates the processing results of the divided image data, and transmits the integrated image data to the printer 14 designated by the user, thus completing the task request.

[Image Processing of Processing Node PC]

Figure 5:
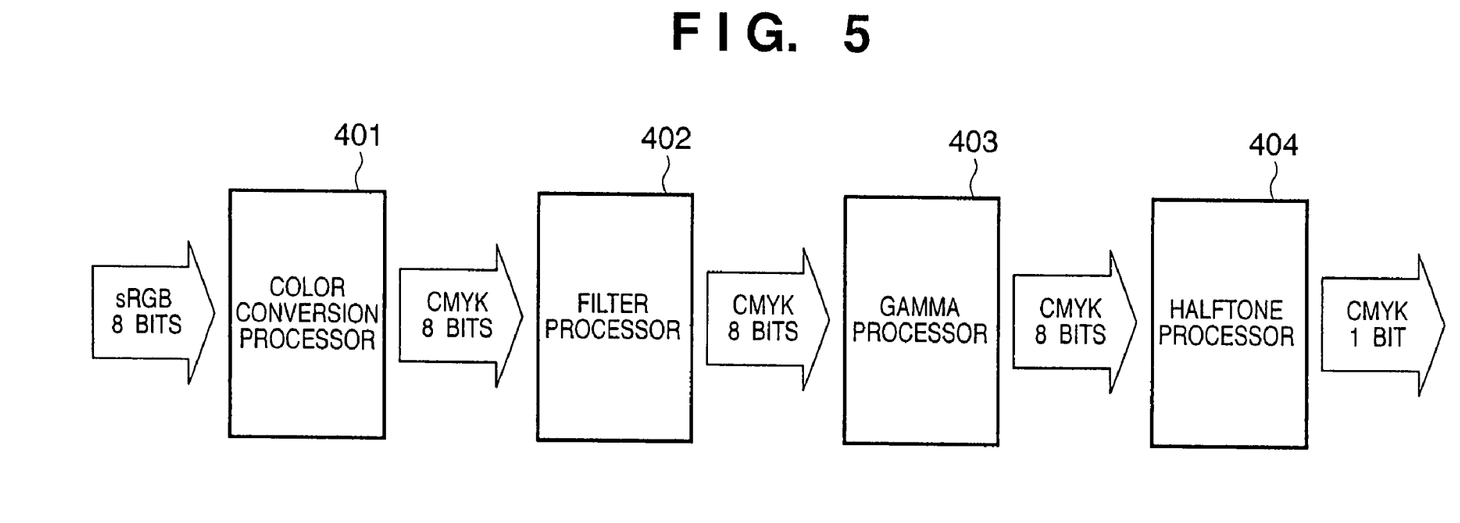
FIG. 5 is a conceptual block diagram of image processes to be executed by a processing node PC.

FIG. 5 is a conceptual block diagram of image processes to be executed by the processing node PC. Each image processing blocks is held by one of the processing node PCs $15_1$ to $15_N$ as software processing modules.

The processing node PC 15 converts sRGB image data which is supplied from the client PC 11 via the TM and broker into CMYK image data of the printer (one of $14_1$ to $14_M$) designated by the user by a color conversion processor 401. This conversion is implemented by interpolation using a known lookup table (LUT). That is, the upper 4 bits of each of RGB values of an input image are used as an address value of a three-dimensional LUT to acquire CMYK values at that address, and an interpolation coefficient is generated using the lower 4 bits of each of the RGB values to interpolate the CMYK values acquired from the LUT, thus deriving CMYK values of 8 bits per color. The three-dimensional LUT is designated upon input of a task by the client PC 11, and is passed to and set in the color conversion processor 401 together with the job.

Next, the processing node PC 15 applies spatial filter processing to the CMYK image data using a filter processor 402. The spatial filter processing is implemented as a convolution operation that calculates the sum of products of, e.g., 5×5 filter coefficients and image data, and is done to adjust the frequency response of an image signal. In order to more sharpen an image, high-frequency emphasis filtering that emphasizes an edge portion is applied; in order to more smoothen an image low-frequency emphasis filtering such as smoothing or the like is applied. Filtering to be applied is determined by coefficient values to be set in the 5×5 filter coefficients of the filter processor 402. These coefficients are designated upon inputting a task by the client PC 11, and the designated coefficients are passed to and set in the filter processor 402 together with the job.

Then, the processing node PC 15 applies adjustment of printer grayscale characteristics (grayscale correction) to the CMYK image data using a gamma processor 403. The grayscale correction is implemented by a linear LUT operation for each of color components C, M, Y, and K. More specifically, output values 0 to 255 which are calculated in advance are output in response to input values 0 to 255 of C, M, Y, and K. The linear LUT is designated upon inputting a task by the client PC 11, and is passed to and set in the gamma processor 403 together with the job.

Finally, the processing node PC 15 converts the halftone-corrected CMYK image signal onto a 1-bit halftone image using a halftone processor 404. As this processing, various known methods are available. In this case, screen processing that compares a threshold matrix and pixel value is done.

The processing node PC 15 has these image processing blocks as software modules, which are launched by the broker in response to a request from the TM. Note that the LUTs used by the color conversion processor 401 and gamma processor 403, and the filter coefficients of the filter processor, which correspond to a plurality of printer models, may be stored in the HDD or the like of the processing node PC in advance, and the appropriate LUTs and filter coefficients may be read out from the HDD or the like in accordance with printer designation and filter designation included in a job and may be set in the corresponding processors.

[Distributed Processing]

Figure 6:
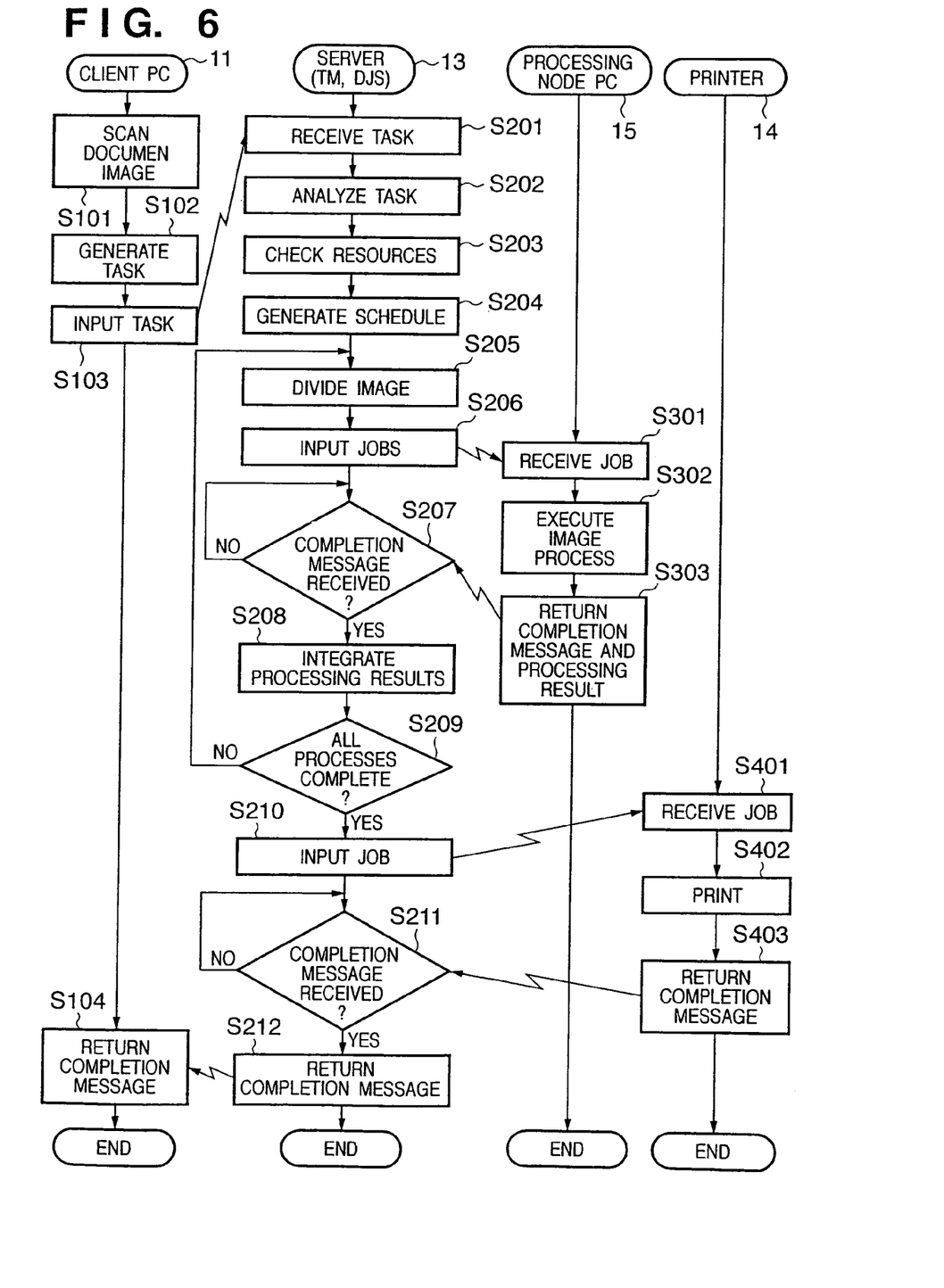
FIG. 6 is a flowchart for explaining the processing of the image processing system.

FIG. 6 is a flowchart for explaining the processing of the image processing system.

When a user interface (UI) of the client PC 11 instructs to scan and print a document image, a task starts. When the task starts, the client PC 11 controls the scanner 12 to scan a document image (S101), generates a task (S102), and inputs the task to the TM which runs on the server 13 together with the scanned image data (S103).

Figure 7:
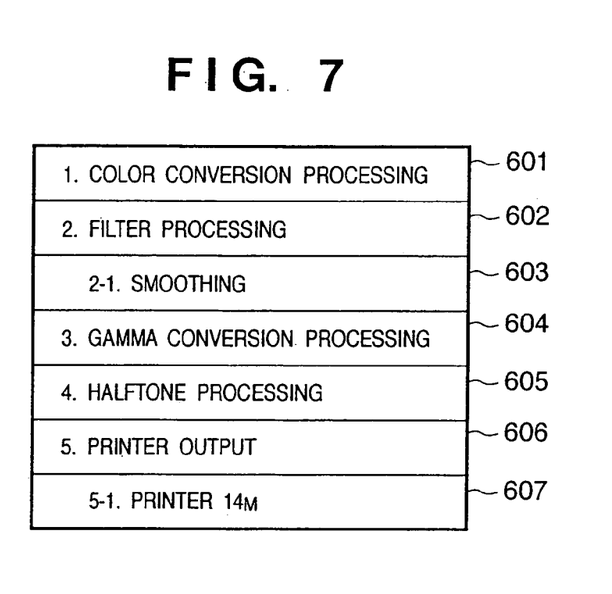
FIG. 7 shows a description of a task list indicating the task contents.

FIG. 7 shows a description of a task list indicating the task contents.

The task list lists the contents of jobs to be done by that task (types of image processes, and print processing in this embodiment), and respective jobs can hold parameters. In the example of the task list shown in FIG. 7, smoothing designation 603 in a filter processing instruction 602, and printer designation 607 in a print output instruction 606 are parameter examples. These parameters are designated by the user on the UI of the client PC 11. The aforementioned LUTs and filter coefficients are appended to the task together with these parameters.

When the server 13 receives the task (S201), the TM requests the DJS to analyze the received task (S202). The DJS checks available resources (processing node PCs) (S203), and performs scheduling by comparing the available resources, and operation load and distributable indices (to be described below) (S204).

Figure 8:
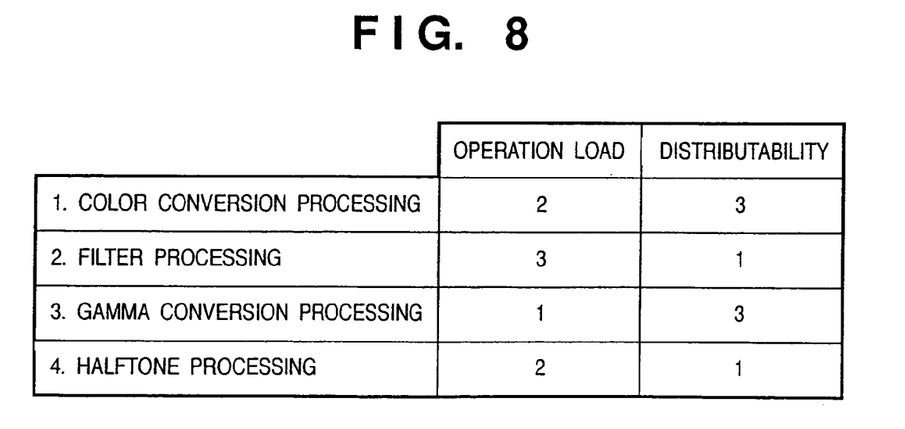
FIG. 8 shows an example of a table of operation load indices and distributable indices defined for respective image processes.

FIG. 8 shows an example a table of operation load indices and distributable indices defined for respective image processes in advance. This table is held on the HDD or the like of the server 13.

For example, 5×5 filter processing (multiply and accumulation) requires 25 multiplications and one addition to process one pixel. Furthermore, when an image is divided to distribute the image processes, divided areas overlap. Hence, in order to integrate the processing results, overlapping portions must be removed. Hence, the filter processing cannot easily undergo distributed processing. Contrary to the filter processing, since the color conversion processing can be implemented by LUT operations, it can be attained by table lookup and interpolation. For example, in known tetrahedral interpolation, the operations require only four multiplications and one addition. In addition, since the color conversion processing is applied to each pixel, it does not require any wasteful processing (removal of overlapping portions, and the like) when an image is divided, distributed, and integrated. The operation load indices and distributable indices are defined in consideration of the characteristics of these image processes.

Figure 9A:
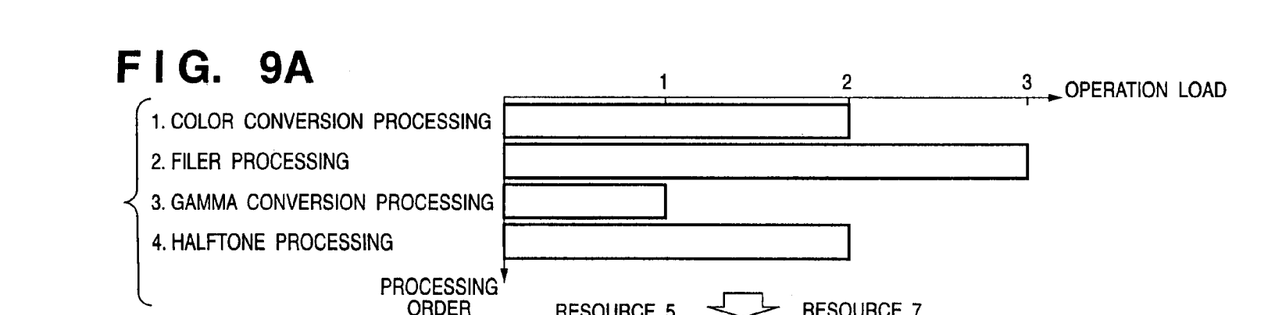
FIGS. 9A to 9C are views for explaining a scheduling strategy.
Figure 9B:
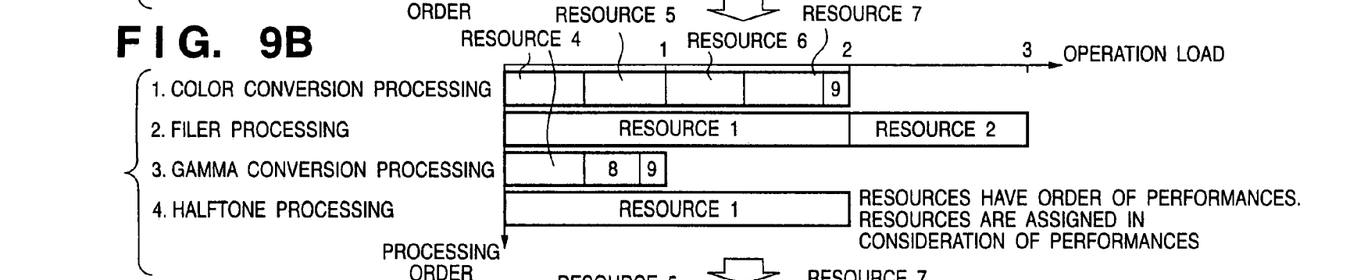
Figure 9C:
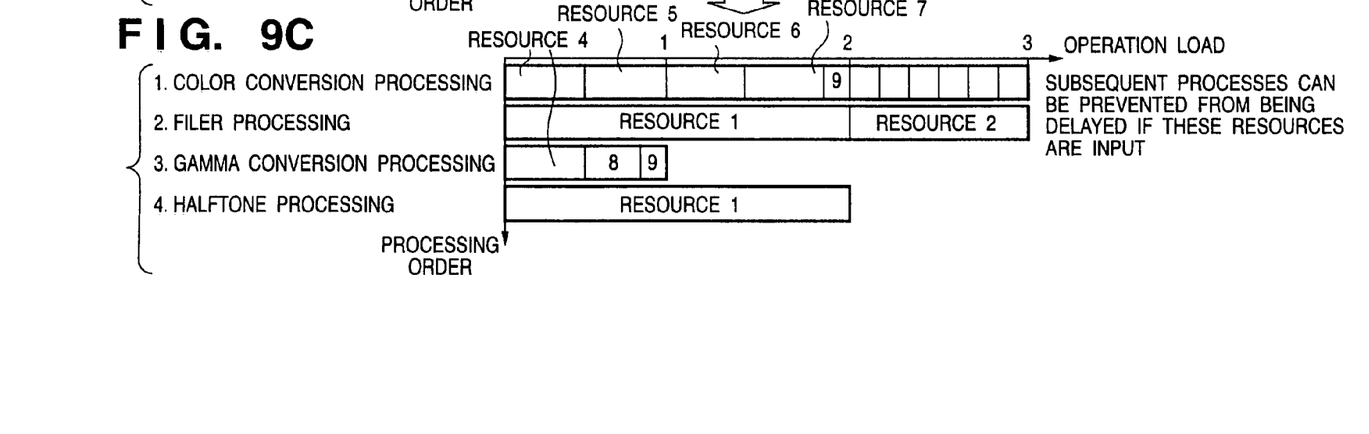

FIGS. 9A to 9C are views for explaining a scheduling strategy.

FIG. 9A indicates the operation load indices in the order of processes in the task list shown in FIG. 7. On the other hand, with reference to the table shown in FIG. 8, the filter processing has a heavy operation load and low distributability. Therefore, filter processing jobs are intensively input to a small number of resources having performance as high as possible of the available resources (see FIG. 9B).

On the other hand, since the color conversion processing and gamma processing have high distributability, even when jobs are input to many resources having low performance, the improvement of the processing speed can be expected. Therefore, in the color conversion processing and gamma processing, jobs are distributed and input to many resources (see FIG. 9B).

The processes have an order, and the next process cannot be started unless the previous process is completed. In consideration of this point, it is desirable to input jobs to many resources to implement upstream processes. FIG. 9C shows a state wherein more resources are assigned to the color conversion processing as upstream processing than the case of FIG. 9B.

The TM divides an image to be processed into pages or bands in accordance with the determined schedule (S205), and inputs jobs to brokers (processing node PCs $15_1$ to $15_N$) corresponding to the resources. (S206).

Upon reception of the jobs (S301), the brokers of the processing node PCs $15_1$ to $15_N$ execute image processes designated by the received jobs (S302). Upon completion of the processes, the brokers return the processing results to the TM together with a completion message (S303).

Upon reception of the completion message (S207), the TM integrates the processing results received from the processing node PCs $15_1$ to $15_N$ (S208), and checks if all the image processes described in the task list are complete (S209). If image processes to be done still remain, the flow returns to step S105 to execute the distributed processing of the next image process. If all the image processes are complete, the TM inputs the job to the printer $14_M$ designated by the task list (S210).

Upon reception of the job (S401), the printer $14_M$ prints an image on the basis of the image data received together with the job (S402). Upon completion of the print processing, the printer $14_M$ returns a completion message to the TM (S403).

In this manner, since the image processes are distributed in accordance with their characteristics, an overhead due to distribution can be reduced, thus implementing high-speed distributed processing. The user of the client PC 11 can copy a document image using the client PC 11, scanner 12, and one of the printers $14_1$ to $14_M$ (normally, a printer convenient to the user is selected) connected to the network 10 without requiring any complicated procedures.

Second Embodiment

The second embodiment according to the present invention will be described below. In the second embodiment, the same reference numerals denote substantially the same components as in the first embodiment, and a detailed description thereof will be omitted.

The second embodiment will exemplify a case wherein the image processes to be executed by the processing node PCs $15_1$ to $15_N$ are switched in accordance with the property of an image to be processed.

In the second embodiment, two LUTs having 16×16×16 grids and 8×8×8 grids are prepared as those used in the color conversion processor 401 shown in FIG. 5. The 8×8×8 LUT is applied to pixels which belong to a text area since image deterioration is inconspicuous even when color reproducibility slightly lowers. The 16×16×16 LUT is applied to pixels which belong to a photo area other than the text area. That is, the color conversion LUTs are switched in accordance with the area attributes for respective pixels.

The halftone processor 404 also includes a processing block that implements error diffusion processing in addition to the screen processing. The error diffusion processing is applied to pixels having a text area attribute to prevent jaggy, and the screen processing is applied to pixels having a photo area attribute other than the text area attribute. That is, the processing blocks are switched in accordance with the area attributes for respective pixels.

Figure 10A:
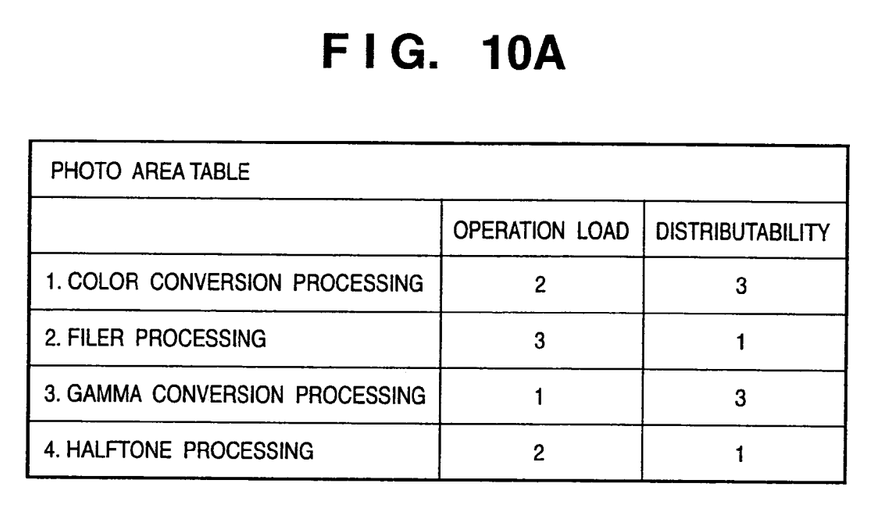
FIGS. 10A and 10B show an example of tables of operation load indices and distributable indices according to the second embodiment.
Figure 10B:
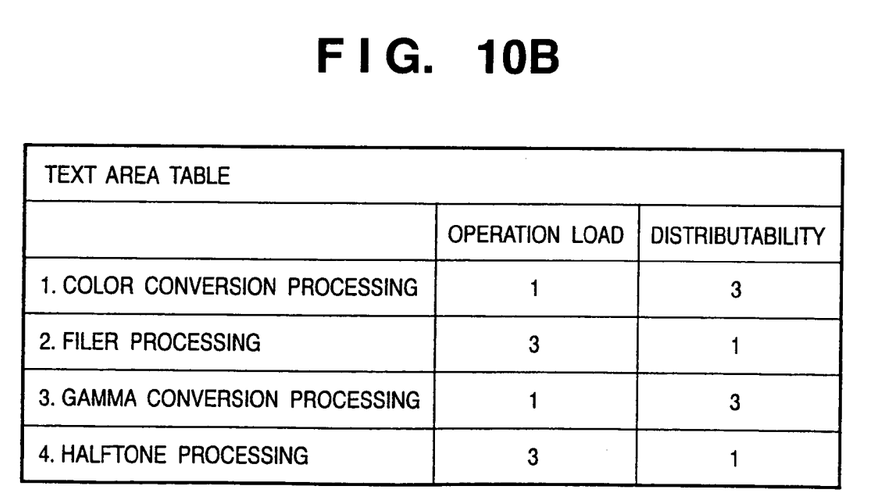

With such image process configuration, in the process of the color conversion processor 401, the LUT with the smaller number of grids can shorten the time required to look up the table, and can reduce the operation load. In the halftone processor 404, since the error diffusion processing requires addition processing of a threshold matrix, it requires a heavier operation load than the screen processing. Therefore, the table indicating the operation load indices and distributable indices shown in FIG. 8 described in the first embodiment includes two patterns of image processing for a text area, and that for a photo area, as shown in FIGS. 10A and 10B.

The client PC 11 of the second embodiment acquires a document image via the scanner driver, separates the document image into image areas by a known method, and assigns region attribute data indicating a text or photo area to each pixel.

The TM requests the DJS to analyze a task received together with image data and area attribute data from the client PC 11. The DJS divides an image into those for a text area and photo area, schedules images for the text area in accordance with the text area table shown in FIG. 10B, and schedules images for the photo area in accordance with the photo area table shown in FIG. 10A. Of course, upon dividing an image for respective image areas, division for respective pages or bands may be combined. Alternatively, an image may be divided into tiles or bands each having a predetermined size, and area attributes in divided images are checked. When many images have a text attribute, they may be scheduled according to the text area table shown in FIG. 10B; when many images have a photo attribute, they may be scheduled according to the photo area table shown in FIG. 10A.

Modification of Embodiment

In the above embodiments, the task which executes the copy function has been exemplified. When the client PC 11 renders and inputs print data as a task in place of transmitting a scanned image, the above embodiments can be applied. Of course, the client PC 11 may input data before rendering, and may control the processing node PCs $15_1$ to $15_N$ in the grid to execute rendering and image processes, thus printing an image.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a flexible disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-171770, filed on Jun. 9, 2004, which is hereby incorporated by reference herein.

What is claimed is:

1. An information processing apparatus connected to a computer network, comprising:
a first receiver, arranged to receive a task and an image to be processed by the task from the computer network;
a manager, arranged to manage states and performances of computer devices connected to the computer network, to analyze an operation load and distributability of respective image processing contained in the task, and to select the computer device used in distributed processing in each of the image processing based on the analyzing result;
a transmitter, arranged to generate and transmit jobs, each of which includes an image subjected to the image processing and divided from the image to be processed and is transmitted to the selected computer device, in accordance with the selection result of the manager;
a second receiver, arranged to receive a processed image corresponding to the divided image from the computer device to which the job was transmitted; and
an integrator, arranged to integrate processed images received by the second receiver to form one image.

2. The apparatus according to claim 1, wherein said transmitter divides the image to be processed into bands or tiles.

3. The apparatus according to claim 1, wherein the manager performs the selection further considering image attribute information appended to the image to be processed and the said transmitter divides the image to be processed in accordance with the image attribute information.

4. The apparatus according to claim 1, wherein the manager selects a small number of the computer devices having high performance for the image processing which has a heavy operation load and low distributability.

5. The apparatus according to claim 1, selects many computer devices having low performance for the image processing which has high distributability.

6. The apparatus according to claim 4, wherein the manager performs the selection referring to a table which indicates the operation load and distributability of each image processing.

7. The apparatus according to claim 4, wherein the manager performs the selection referring to a table which indicates the operation load and distributability of each image processing and each image attribute.

8. The apparatus according to claim 1, wherein further comprising a controller arranged to control the manager, the transmitter, the second receiver, and the integrator in a processing order of a plurality of image processing contained in the task to complete the task.

9. The apparatus according to claim 1, further comprising an output section arranged to output a job including the image integrated by the integrator to a printer.

10. The apparatus according to claim 1, wherein the manager selects a smaller number of computer devices having a higher performance for a first image processing than for a second image processing when the first image processing has a higher operation load and a lower distributability than that of the second image processing.

11. A method of controlling an information processing apparatus connected to a computer network, the method comprising the steps of:
    receiving a task and an image to be processed by the task from the computer network;
    managing states and performances of computer devices connected to the computer network;
    analyzing an operation load and distributability of respective image processing contained in the task;
    selecting the computer device used in distributed processing in each of the image processing based on the analyzing result;
    generating and transmitting jobs, each of which includes an image subjected to the image processing and divided from the image to be processed, and is transmitted to the selected computer device, in accordance with the selection result in the selecting step;
    receiving a processed image corresponding to the divided image from the computer device to which the job was transmitted; and
    integrating processed images received in the second receiving step to form one image.

12. A computer-readable storage medium storing a computer-executable program for causing a computer to perform a method of controlling an information processing apparatus connected to a computer network, the method comprising the steps of:
    receiving a task and an image to be processed by the task from the computer network;
    managing states and performances of computer devices connected to the computer network;
    analyzing an operation load and distributability of respective image processing contained in the task;
    selecting the computer device used in distributed processing in each of the image processing based on the analyzing result;
    generating and transmitting jobs, each of which includes an image subjected to the image processing and divided from the image to be processed, and is transmitted to the selected computer device, in accordance with the selection result in the selecting step;
    receiving a processed image corresponding to the divided image from the computer device to which the job was transmitted; and
    integrating processed images received in the second receiving step to form one image.

13. An information processing apparatus connected to a computer network, comprising:
    a manager arranged to manage states and performances of devices connected to the computer network, to analyze an operation load and distributability of respective image processing contained in a task, and to select at least one device that processes a first image processing contained in the task and at least one device that processes a second image processing contained in the task in accordance with the analyzing result;
    a transmitter, arranged to generate jobs, each of which includes a divided image subjected to the image processing and divided from an image, and is transmitted to the selected device;
    a receiver, arranged to receive a processed image corresponding to the divided image from the device to which the job was transmitted; and
    an integrator, arranged to integrate processed images received by the receiver to form one image.

14. An information processing method of an information processing apparatus connected to a computer network, the method comprising the steps of:
    managing states and performances of devices connected to the computer network,
    analyzing an operation load and distributability of respective image processing contained in a task;
    selecting at least one device that processes a first image processing contained in the task and at least one device that processes a second image processing contained in the task in accordance with the analyzing result;
    generating and transmitting jobs, each of which includes a divided image subjected to the image processing and divided from an image, and is transmitted to the selected device;
    receiving a processed image corresponding to the divided image from the device to which the job was transmitted; and
    integrating processed images received in the receiving step to form one image.

* * * * *